United States Patent
Glos

(10) Patent No.: US 8,912,277 B2
(45) Date of Patent: Dec. 16, 2014

(54) SILOXANE COMPOSITIONS

(75) Inventor: Martin Glos, Borken (DE)

(73) Assignee: Evonik Degussa GmbH, Essen (DE)

( * ) Notice: Subject to any disclaimer, the term of this patent is extended or adjusted under 35 U.S.C. 154(b) by 482 days.

(21) Appl. No.: 12/866,565

(22) PCT Filed: Dec. 12, 2008

(86) PCT No.: PCT/EP2008/067405
§ 371 (c)(1),
(2), (4) Date: Aug. 6, 2010

(87) PCT Pub. No.: WO2009/097936
PCT Pub. Date: Aug. 13, 2009

(65) Prior Publication Data
US 2011/0028578 A1    Feb. 3, 2011

(30) Foreign Application Priority Data
Feb. 8, 2008   (DE) .......................... 10 2008 000 255

(51) Int. Cl.
| | | |
|---|---|---|
| *C08L 83/04* | (2006.01) | |
| *C08G 18/76* | (2006.01) | |
| *C08J 9/00* | (2006.01) | |
| *C08G 18/28* | (2006.01) | |
| *C08G 18/65* | (2006.01) | |
| *C08G 101/00* | (2006.01) | |

(52) U.S. Cl.
CPC ............ *C08J 9/0061* (2013.01); *C08J 2483/00* (2013.01); *C08G 18/7607* (2013.01); *C08G 18/2825* (2013.01); *C08G 2101/0008* (2013.01); *C08G 18/283* (2013.01); *C08G 2101/0025* (2013.01); *C08G 2101/0083* (2013.01); *C08J 2491/00* (2013.01); *C08J 2375/04* (2013.01); *C08G 18/6535* (2013.01)
USPC ......................................................... 524/588

(58) Field of Classification Search
USPC ........................................................ 524/588
See application file for complete search history.

(56) References Cited

U.S. PATENT DOCUMENTS

| | | | |
|---|---|---|---|
| 3,730,920 A * | 5/1973 | D'Alessandro ................ | 521/54 |
| 2005/0070620 A1 | 3/2005 | Herrington et al. | |
| 2006/0293400 A1 | 12/2006 | Wiltz, Jr et al. | |
| 2008/0139685 A1* | 6/2008 | Reese et al. .................. | 521/174 |

FOREIGN PATENT DOCUMENTS

| | | |
|---|---|---|
| EP | 1930355 | 6/2008 |
| WO | WO 2006/003668 | 1/2006 |

* cited by examiner

*Primary Examiner* — Kuo-Liang Peng
(74) *Attorney, Agent, or Firm* — Frommer Lawrence & Haug LLP

(57) ABSTRACT

The invention relates to siloxane compositions containing a mixing component that is based on cashew nut shell liquid—CNSL.

17 Claims, No Drawings

SILOXANE COMPOSITIONS

The invention relates to a process for the preparation of polyurethane foams from compositions which contain polyols and isocyanates, the preparation optionally also being carried out in the presence of further additives and admixtures.

Typically, additives and admixtures must be added to the system before the reaction in order to achieve the desired foam properties. These additives and admixtures include, for example, the class consisting of the siloxanes.

In the preparation of foams based on polyols and isocyanates, organomodified siloxanes are generally used as stabilizers. These siloxanes are added during the foaming often not in pure form but as a mixture with further non-silicon-containing components. This may serve for improving the meterability, since often only very small amounts of siloxane have to be added to the mixture to be foamed. In addition, the admixed component may also improve the solubility of the siloxanes in the polyol mixture and thus additionally influence the foaming and the foam properties.

The prior art discloses various admixed components:

EP-0839852 describes the preparation of polyurethane foam using siloxanes as a mixture with vegetable oils consisting of different triglycerides.

The fatty acid esters are often raw materials which can also be used in food production, resulting in a competitive situation.

It is therefore desirable to use raw materials which are based on renewable raw materials, are readily biodegradable and are not suitable for food production.

U.S. Pat. No. 3,629,308 describes butanol-initiated polyethers as an admixed component for organosiloxanes.

EP-0048984 describes mixtures of siloxanes with various water-soluble surfactants for use in polyester-polyurethane foam. These surfactants are often poorly biodegradable.

EP-0043110 describes mixtures of siloxanes with solvents, such as, for example, alkoxylates of glycerol, water, TMP, butanol and nonylphenol, for use in highly resilient polyurethane foam.

U.S. Pat. No. 5,236,961 describes the preparation of polyurethane foams using alkylphenol ethoxylates as foam stabilizers, these originating from petrochemical sources.

EP-0734404 describes the preparation of PU foams using polyalkylene oxides, the polyalkylene oxides being synthesized by using 10 to 90% of butylene oxide.

The most used admixed components include, for example, phthalic acid esters, nonylphenol ethoxylates or butanol alkoxylates.

Many of the admixed components described in the prior art are distinguished by unfavourable toxicity, poor biodegradability or sensitivity to hydrolysis.

There was therefore a need to provide admixed components for the additives and admixtures in polyurethane foam preparation, which components do not have the above-mentioned disadvantages or at least may be an alternative thereto.

An object of the present invention is therefore to provide a process for the preparation of advantageous, alternative siloxane compositions, the siloxane compositions themselves, the use thereof and polyurethane and/or polyisocyanurate and/or polyurea foams to which they have been added.

In the context of this invention, polyurethane and/or polyisocyanurate and/or polyurea foams are understood as meaning reaction products of polyols and isocyanates, the preparation optionally also being carried out in the presence of further additives and admixtures.

A further object of the present invention is the provision of an admixed component for siloxanes in polyurethane and/or polyisocyanurate and/or polyurea foam preparation.

Surprisingly, it was found that the object could be achieved by using products based on cashew nut shell oil (CNSL) for mixing with siloxane components.

The invention is therefore concerned with improving the process for the preparation of polyurethane foams using alkylphenol-containing compositions, as occur, for example, in CNSL-based products. CNSL is the abbreviation for Cashew Nut Shell Liquid, i.e. cashew nut shell oil. The compositions according to the invention contribute towards improving the foam properties. At the same time, raw materials for the preparation of the siloxane composition are used which consist of non-petrochemical products, i.e. to a high proportion of renewable raw materials.

The present invention relates to the preparation of polyurethane foams from compositions which contain polyols and isocyanates, the preparation being carried out in the presence of a certain silicon-containing copolymer surfactant, for example a siloxane. The silicon-containing surfactant is mixed with the CNSL-based compounds in order to improve not only the meterability of the siloxane but also the properties of the foam thus prepared.

An advantage is that equivalent or better results are obtained in the foaming than with the use of, for example, nonylphenol ethoxylates or other admixed components.

In addition, CNSL-based products are readily biodegradable, and toxicologically safe and originate from natural renewable raw materials. Furthermore, the CNSL-based products are not suitable for the preparation of foods and therefore do not "compete" for food production.

CNSL is understood as meaning so-called Cashew Nut Shell Liquid, i.e. cashew nut shell oil. This is obtained by extraction of the outer shell of the cashew nut. In general, the extract is obtained by heating the shells. However, it can also be prepared by extraction methods in which solvents are used.

Depending on origin and method, the extract may have variable compositions. The main components are: cardanol, anacardic acid, cardol and methylcardol. The proportion of anacardic acid and cardanol can vary to a particularly great extent since the anacardic acid is decarboxylated by heating during the hot extraction and is thus converted into cardanol.

In general, the cardanol is obtained from the CNSL as an alkylphenol component, which can then be further processed to give a very wide range of products (alkoxylates, formaldehyde resins, etc.). Cardanol is obtained from CNSL by distillation.

On heating the CNSL, polymerization processes occur starting from the alkenyl side chains of the phenols present. The distillation residue which consists of these higher molecular weight species is therefore also obtained in the distillative preparation of cardanol.

The various CNSL-based products, such as, for example, the extract itself, the distillation products or the distillation residues, can be used for the mixtures according to the invention.

The cardanol preparation from CNSL is described, inter alia, in the patent applications DE-10 2005 017126, DE-10 2005 017125.

According to the invention, it is also possible concomitantly to use products which are prepared from CNSL, such as, for example, alkoxylates, resins which can be prepared by reactions with aldehydes, or oxidation products of CNSL, etc. These derivatives have been used to date only as a polyol component in polyurethanes. The use as an admixed component for siloxanes is not described.

Thus, US-20050022445 describes alkoxylates of CNSL which serve as emulsifiers for water/fuel mixtures.

U.S. Pat. No. 7,084,103 describes ethoxylates of cardanol and cardol and the use thereof as lubricants or dispersants.

U.S. Pat. No. 2,531,502 describes the preparation of CNSL-based oxyalkylates, the CNSL first being treated with an oxygen-containing gas mixture, with the result that a "blown" CNSL forms, which is then oxyalkylated.

GB-2262525 describes the preparation of ethoxylates based on industrial cashew nut shell oil.

DE-2754091 mentions and describes cardanol derivatives (anacardic acid, cardanol, cardol) as a basis for the ethoxylation, and the use thereof as emulsifiers in the alkyd resin system.

EP-1765901 describes polyols for the preparation of rigid PU foams which are prepared on the basis of CNSL by epoxidation of the double bonds in the alkylene side chain and subsequent ring opening in order to increase the OH number of the polyol. The use of CNSL-based polyols as an admixed component for the siloxanes is not described.

EP-1723187 describes the preparation of polyols based on distillation residues from the preparation of cardanol. These residues are reacted with alkylene oxides, and the polyols obtained are used for the preparation of PU binder mixtures. No PU foams or mixtures with siloxanes are mentioned.

IN 180735 describes polyols for the preparation of rigid PU foam which are prepared on the basis of CNSL mixtures by reaction with reaction products of castor oil reaction products and polyhydroxy compounds, such as, for example pentaerythritol.

DE-10106144 describes the use of cardanol-aldehyde resins as asphalt dispersants in crude oil.

U.S. Pat. No. 6,262,148 describes phenalkylamine curing agents for epoxy resins which consist of a Mannich base reaction product, which, based on CNSL chemistry, form by reaction with an alicyclic or aromatic polyamine having 5-7 carbon atoms.

CNSL usually comprises dark-coloured strongly smelling substances.

With the use of customary methods known to the person skilled in the art, such as distillation, extraction or absorption, colour and odour of the CNSL-based products can be optimized and thus also used in more demanding applications. Optionally, suitable fragrances can also be used for adjusting the olfactory properties.

Thus, for example, the publications DE-10 2005 017126 and DE-10 2005 017125 already mentioned above are concerned with the preparation of colour-stable cardanol-containing compositions which serve for the preparation of phenalkamines, which in turn are used as curing agents for epoxy resins. Here, distillation and absorption methods are combined.

The substances suitable according to the prior art can be used as siloxane copolymers or siloxanes. Thus, depending on the foam type (rigid foams, hot flexible foams, viscoelastic foams, ester foams, HR foams, semirigid foams), a suitable siloxane must be used.

Surprisingly, it was found that the mixtures according to the invention can be used in all these foam types.

The proportion of siloxane copolymer in the mixture may be from 0.1 to 98%, preferably from 0.3 to 95%, particularly preferably from 0.5 to 90%, in particular from 1 to 80% or from 5 to 70% and very particularly preferably from 10 to 60%, optionally depending on the respective intended use, based in each case on percent by weight of the total mixture.

Accordingly, the proportion of CNSL-based products is from 2 to 99.9%, preferably from 5 to 99.7%, particularly preferably from 10 to 99.5%, in particular from 20 to 99% or from 30 to 95% and very particularly preferably from 40 to 90%, optionally depending on the respective intended use, based in each case on percent by weight of the total mixture.

The admixed components known according to the prior art, such as, for example, polyethers, nonylphenol ethoxylates, nonionic surfactants, ionic surfactants and other substances or auxiliaries, may optionally also be present as a further component in the composition, in proportions of from 0 to 95%, or from 0.1 to 80%, based in each case on percent by weight of the total mixture.

In this application, percentage data are to be understood as meaning based on weight, unless specially designated.

Different foam types require different siloxane copolymers and mixtures thereof.

In the preparation of rigid polyurethane and polyisocyanurate foams, additives are used which ensure a fine-cell, uniform and defect-free foam structure and thus substantially positively influence the performance characteristics—in particular thermal insulation power. Further criteria important in the preparation of rigid foams are the flowability and volume yield of the foam in the case of a given formulation and amount of blowing agent. In the preparation of spray foams or applications in the automotive sector, rigid foams having an open-cell structure are often also required. Here, the stabilizer must then also have a cell-opening effect, which is undesired in the case of rigid foams in the insulation sector. All these parameters can be positively influenced by the choice of an optimized stabilizer.

In the case of the flexible polyurethane foams, the functions of the siloxane may be very different depending on formulation, according to the properties which the foam formulation should have. The basic requirement is the stabilization of the foam desired, i.e. the avoidance of collapse phenomena. In the case of "intrinsically stable" formulations, the requirements and the siloxanes are then tailored to cell regulation, cell opening or flow improvement. A possible example of this may be moulded foams for the production of automobile seats.

Surprisingly and completely unexpectedly, it has now been found that the admixed components according to the invention, based on cashew nut oil, can be used for the whole variety of siloxanes and also the foam types resulting therefrom.

The siloxane-containing formulations according to the invention are suitable for all foam types which can be prepared by reacting polyols with polyisocyanates (rigid foams, hot flexible foams, viscoelastic foams, ester foams, HR foams, semirigid foams, etc.).

The preparation of the foams is effected by the known processes, reacting polyols and isocyanates in the presence of a blowing agent, it being possible for flexible foams, semirigid foams or rigid foams to form, depending on which polyols and isocyanates are used. These may be polyurethane, polyisocyanurate or polyurea foams.

For the preparation of the foams, suitable polyols are used. These may be polyether polyols or polyester polyols, which typically carry 2 to 6 OH groups per molecule and, in addition to carbon, hydrogen and oxygen, may also contain heteroatoms, such as nitrogen, phosphorus or halogens.

Furthermore, suitable organic polyisocyanates which have a functionality greater than or equal to 2 are used. Corresponding compounds are known and are commercially available.

For the preparation of a foam, a blowing agent is required. All known blowing agents may be used. This may be water as a chemical blowing agent, which liberates carbon dioxide by reaction with the isocyanates. However, it is also possible to use carbon dioxide directly as a physical blowing agent or other blowing agents which are vaporized by suitable boiling point during the exothermic reaction. Examples of these are hydrogen halides or hydrocarbons, such as, for example, pentane isomers. Combinations of the two methods are also possible.

The urethane foam reaction is usually initiated or controlled by suitable catalysts. For example, tertiary amines or metal-containing catalysts (containing, for example, tin, potassium, zinc) are used here.

The foams can be prepared by the known methods.

These can be carried out batchwise or continuously, with free rise or in a mould. The silicon-containing surfactant mixture can be mixed directly for foaming with the polyols and isocyanates. However, it is also possible to prepare a premix from the surfactant, one or more blowing agents, the polyol and the catalysts.

The compounds customary in this area for the respective foam types, as mentioned, for example, in EP-1712578, EP-1161474, WO-00/58383, EP-1678232 and WO-2005/085310, WO-2006/094227, WO-2004/096882, US-2002/0103091, WO-2006/116456, EP-1678232, US-2007/0072951, WO-2007/111828, US-20070238800 and WO-9612759, can be used as polyols, blowing agents and polyisocyanates for the preparation of the polyurethane foams.

Suitable siloxanes are described, for example, in the following documents: EP-0839852, EP-1544235, DE-10 2004 001 408, EP-0839852, WO-2005/118668, US-20070072951, DE-2533074, EP-1537159 EP-0533202, U.S. Pat. No. 3,933, 695, EP-0780414, DE-4239054, DE-4229402, EP-0867465.

All flameproofing agents known according to the prior art are suitable. Examples of such substances are described in DE-19927548 or are cited there.

Further auxiliaries which are required for the preparation and/or use of the foam and are familiar to the person skilled in the art who is concerned with the foaming may likewise be present in the foam composition. These are, for example, flameproofing agents, dyes, pigment preparations, cell openers, biocides, antistatic additives, etc.

The auxiliaries and additives which can be used for the preparation of the polyurethane foams, such as, for example, catalysts, stabilizers, flameproofing agents, blowing agents, are likewise the components known from the prior art.

A summary of the prior art, of the raw materials used and of processes which can be used is to be found in G. Oertel (Editor): "Kunststoffhandbuch [Plastics Handbook]", Volume VII, C. Hanser Verlag, Munich, 1983, in Houben-Weyl: "Methoden der organischen Chemie [Methods of Organic Chemistry]", Volume E20, Thieme Verlag, Stuttgart 1987, (3), pages 1561 to 1757, and in "Ullmann's Encyclopedia of Industrial Chemistry", Vol. A21, VCH, Weinheim, 4th Edition 1992, pages 665 to 715.

Further subjects of the invention are characterized by the claims.

The admixed components according to the invention and the use thereof are described by way of example below, without it being intended that the invention be limited to these exemplary embodiments. Where ranges, general formulae or classes of compounds are stated below, these are intended to comprise not only the corresponding ranges or groups of compounds which are explicitly mentioned but also which all partial ranges and partial groups of compounds which can be obtained by removal of individual values (ranges) or compounds.

Experimental Section:

In the examples mentioned below, the present invention is described by way of example without there being any intention to limit the invention, the scope of use of which is evident from the entire description and the claims, to the embodiments mentioned in the examples.

The following siloxanes were used:

Siloxane 1: Polyethersiloxane as described in EP 1544235 A1, in Example 14

Siloxane 2: Polydimethylsiloxane as described in DE 2533074 A1, Example 4, as mixture 1

Siloxane 3: Polyethersiloxane as described in EP 1544235 A1 with x=70, y=4 and two polyethers with 37 equivalent % of polyether 1 (a=36, b=38 and R"=methyl) and 63 equivalent % of polyether 2 (a=12, b=0 and R"=methyl)

Thus, siloxane 3 is a polyethersiloxane according to the following formula:

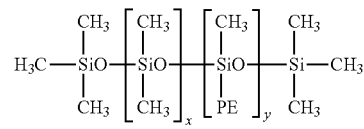

in which y=4, x=70, PE: polyether or in this case a mixture of two polyethers: 37.5 equivalent % of a methylated polyether with Mn=3800 g/mol, prepared from 58% by weight of propylene oxide and 42% by weight of ethylene oxide and 62.5 equivalent % of a methylated polyether with Mn=600 g/mol, prepared from 100% by weight of ethylene oxide.

The preparation of such Si—C-linked polyethersiloxanes is described by way of example in U.S. Pat. No. 4,147,847, EP 0493836 and U.S. Pat. No. 4,855,379.

Siloxane 4: A 1,1,1,2,3,3,3-heptamethyltrisiloxane was reacted with an allyl alcohol-initiated polyether having a PO content of 30% and EO content of 70% and an average molar mass of 900 g/mol using a suitable Pt catalyst to give the corresponding polyethersiloxane by the methods described in DE 43 17 605:

The disclosure content of DE-4317605, EP-1544325 and DE-2533074 is hereby part of the description in its entirety.

The following admixed components based on CNSL were used:

A) CNSL CT: cashew nut shell liquid from Imperial Oil Import
B) CNSL RS 1: residue from CNSL distillation, obtainable from Imperial Oil Import
C) RS 1+5 EO=reaction product of CNSL RS 1 with 5 mol of ethylene oxide per OH function
D) CNSL: cashew nut shell liquid from Resibras
E) Cardolite NC-700: cardanol from Cardolite
F) NC-700+5 EO: reaction product of Cardolite NC-700 with 5 mol of ethylene oxide per OH function
G) NC-700+5 PO: reaction product of Cardolite NC-700 with 5 mol of propylene oxide per OH function
H) Cardanol 1: cardanol which was prepared by the process described in DE-102005017126
J) Cardanol 2: which was prepared by the process described in DE-102005017125.

In the comparative examples, the following substances were used as typical members of the admixed components not according to the invention:

K) Nonylphenol+8EO: reaction product of nonylphenol with 8 mol of ethylene oxide per OH function, commercially available, for example, as Arkopal N 080 from Clariant L) Castor oil, commercially available, for example, from Alberding+Boley, Krefeld M) PEG 400 dioleate, commercially available, for example, as MARLOWET 4702 from Sasol N) Diisononyl phthalate, commercially available, for example, as Jayflex DINP from Exxon.

Following mixtures of siloxanes were prepared:

TABLE 1

|  | Organosiloxane | Admixed component |
|---|---|---|
| Ex. 1 | Siloxane 1, 50 parts | A), 50 parts |
| Ex. 2 | Siloxane 1, 50 parts | D), 50 parts |
| Ex. 3 | Siloxane 1, 50 parts | E), 50 parts |
| Ex. 4 | Siloxane 1, 50 parts | B), 50 parts |
| Ex. 5 | Siloxane 1, 50 parts | G), 50 parts |
| Ex. 6 | Siloxane 1, 50 parts | F), 50 parts |
| Ex. 7 | Siloxane 1, 50 parts | H), 50 parts |
| Ex. 8 | Siloxane 1, 50 parts | J), 50 parts |
| Comp. 1 | Siloxane 1, 50 parts | K), 50 parts |
| Comp. 2 | Siloxane 1, 50 parts | L), 50 parts |
| Comp. 3 | Siloxane 1, 50 parts | M), 50 parts |
| Comp. 4 | Siloxane 1, 50 parts | N), 50 parts |
| Ex. 9 | Siloxane 2, 10 parts | C), 90 parts |
| Ex. 10 | Siloxane 2, 10 parts | E), 90 parts |
| Ex. 11 | Siloxane 2, 10 parts | B), 90 parts |
| Ex. 12 | Siloxane 2, 10 parts | A), 90 parts |
| Comp. 5 | Siloxane 2, 10 parts | N), 90 parts |
| Ex. 13 | Siloxane 3, 65 parts | F), 35 parts |
| Ex. 14 | Siloxane 3, 65 parts | C), 35 parts |
| Ex. 15 | Siloxane 3, 65 parts | E), 35 parts |
| Comp. 6 | Siloxane 3, 65 parts | K), 35 parts |
| Ex. 16 | Siloxane 4, 35 parts | A), 65 parts |
| Ex. 17 | Siloxane 4, 35 parts | F), 65 parts |
| Comp. 7 | Siloxane 4, 35 parts | K), 65 parts |

Use Examples for Rigid Polyurethane Foams:

For testing the performance characteristics of the siloxane mixtures according to the invention, the following formulation was used:

TABLE 2

| Component | Amount used |
|---|---|
| Polyetherpolyol* | 95 g (100 parts) |
| DMCHA** | 1.4 g (1.5 parts) |
| Water | 2.5 g (2.6 parts) |
| Cyclopentane | 12.4 g (13.1 parts) |
| Mixture according to Tab. 1 as stabilizer | 1.4 g (1.5 parts) |
| MDI*** | 188.6 g (198.5 parts) |

*Daltolac R 471 from Huntsman
**DMCHA = dimethylcyclohexylamine
***polymeric MDI, 200 mPa*s, 31.5% NCO, functionality 2.7

The foamings were carried out by the manual mixing method. For this purpose, polyol, catalysts, water, the stabilizer formulation to be tested and blowing agent were weighed into a beaker and mixed by means of a pan stirrer (6 cm diameter) for 30 s at 1000 rpm. By weighing again, the amount of blowing agent which had evaporated during the mixing process was determined and was replenished. The MDI was now added, and the reaction mixture was stirred with the stirrer described for 5 s at 3000 rpm and immediately transferred to an aluminium mould thermostatted at 45° C. and measuring 145 cm×14 cm×3.5 cm, which was inclined at an angle of 10° (along the side measuring 145 cm) and was lined with polyethylene film. The foam formulation was introduced on the lower-lying side so that the expanding foam fills the mould in the feed region and rises in the direction of the higher side. The amount of foam formulation used was such that it was below the amount required for the minimum filling of the mould. The length of the shaped foam article obtained after curing can thus be used—standardized with respect to the weight—as a measure of the volume yield.

After 10 min, the foams were removed from the mould and analysed. Surface and internal defects were assessed subjectively on the basis of a scale from 1 to 10, 10 representing an undisturbed foam and 1 an extremely strongly disturbed foam. The pore structure (average number of cells per 1 cm) was assessed optically on a cut surface by comparison with comparative foams. The flow length (as a measure of the volume yield) was determined by measuring the shaped foam article and, for better comparison, converted according to the following formula to a standard weight of 260 g and atmospheric pressure:

$$\text{reduced flow length} = \text{foam length} * 260 \text{ g} * \text{air pressure} / (\text{foam weight} * 1013 \text{ mbar})$$

All siloxane mixtures used and the associated foaming results are listed in Table 3.

TABLE 3

|  | Siloxane mixture from | Foam quality regarding defects | | | Cell fineness in cells/cm | Reduced flow length/cm |
|---|---|---|---|---|---|---|
|  |  | Top | Bottom | Interior |  |  |
| Ex. 18 | Ex. 1 | 5 | 5 | 7 | 36-40 | 133.6 |
| Ex. 19 | Ex. 2 | 5.5 | 5 | 7 | 36-40 | 132.6 |
| Ex. 20 | Ex. 3 | 4.5 | 5 | 6.5 | 36-40 | 132.6 |
| Ex. 21 | Ex. 4 | 5.5 | 4.5 | 6.5 | 36-40 | 133.1 |
| Ex. 22 | Ex. 6 | 5 | 4.5 | 6.5 | 36-40 | 132.8 |
| Ex. 23 | Ex. 5 | 5 | 5 | 7 | 36-40 | 134.1 |
| Ex. 24 | Ex. 7 | 5 | 5 | 7 | 36-40 | 133.7 |
| Ex. 25 | Ex. 8 | 5.5 | 5 | 7 | 36-40 | 133.1 |
| Comp. 8 | Comp. 1 | 4 | 4 | 6 | 36-40 | 130.7 |
| Comp. 9 | Comp. 4 | 4 | 4 | 6 | 36-40 | 131.0 |
| Comp. 10 | Comp. 2 | 4 | 4 | 6.5 | 36-40 | 131.1 |
| Comp. 11 | Comp. 3 | 4 | 4 | 5.5 | 36-40 | 130.8 |

The results show that, with the mixtures, according to the invention, of the tested siloxanes, it is possible to prepare rigid foams which achieve equally good results with regard to cell fineness—cell fineness remains unchanged—and even better results than conventional admixed components (prior art) with regard to surface quality and with regard to flowability or volume yield—significantly increased values.

EXAMPLES FOR HR FOAM

High-Resilience Foam, Cold Foam

Preparation of Moulded Foam:

The following formulation was used:

100 parts of polyol having an of OH number 35 mg KOH/g and a molar mass of 5000 g/mol, 0.5 part of the siloxane mixture, 3 parts of water, 2 parts of triethanolamine, 0.6 part of TEGOAMIN® 33 (from Evonik Goldschmidt GmbH) and 0.2 part of diethanolamine and a mixture of 18.5 parts of polymeric MDI (44V20 from Bayer) and 27.7 parts of TDI (toluoylene diisocyanate, T80).

The foams were prepared in the known manner by mixing all components except for the isocyanate in a beaker, then adding the isocyanate and stirring it in rapidly at high stirrer speed. Thereafter, the reaction mixture was introduced into a cuboid mould having the dimensions 40×40×10 cm, which was heated to a temperature of 40° C., and the mass was allowed to cure for 10 minutes. The compressive forces were then measured. Here, the foams were compressed 10 times to 50% of their height. Here, the 1st measured values (CF 1 in Newton) is a measure of the open-cell character of the foam. Thereafter, compression was effected completely (manually) in order to be able to determine the hardness of the compressed foam at the 11th measured value (CF 11 in Newton). Thereafter, the foams were cut open in order to assess the skin and edge zone and to determine the cell count (CC).

In the following Table 4, Examples 26 to 29 and Comparative Example 12 are summarized. The assessments and the siloxane mixture used in each case are shown.

TABLE 4

Results for the examples for high-resilience foam

| Example | CF 1 | CF 11 | CC | Skin | Edge zone | Siloxane mixture from examples: |
|---|---|---|---|---|---|---|
| 26 | 1281 | 146 | 10 | good | good | Ex. 9 |
| 27 | 1096 | 112 | 10 | good | good | Ex. 10 |
| 28 | 1235 | 139 | 10 | good | good | Ex. 11 |
| 29 | 1174 | 129 | 10 | good | good | Ex. 12 |
| Comp. 12 | 1115 | 122 | 10 | good | good | Comp. 5 |

CF = compressive force in Newton

The results show that the siloxane formulations (compositions) according to the invention are suitable for the preparation of high-resilience PU foams, and the open-cell character (and the hardness) of the foam can be influenced by a suitable choice of the admixed component according to the invention.

Foamings in Hot Flexible Foam:

The siloxane mixtures were investigated in a typical hot flexible polyurethane foam formulation:

Formulation for the preparation of the hot flexible polyurethane foams:

100 parts by weight of polyol (Desmophen® PU20WB01 from Bayer, Ohio number 56), 5.0 parts by weight of water (chemical blowing agent), 1.0 part by weight of mixture of the polyethersiloxane, 0.15 part by weight of amine catalyst (triethylenediamine), 0.23 part by weight of tin catalyst (tin 2-ethylhexanoate), 5.0 parts by weight of methylene chloride (additional physical blowing agent), 63.04 parts by weight of isocyanate (toluoylene diisocyanate, TDI-80) (ratio of isocyanate groups to isocyanate-consuming reactive groups=1.15)

Procedure:

Polyol, water, catalysts and stabilizer were initially introduced into a paper cup and thoroughly mixed with a stirring disc (45 s at 1000 rpm). Thereafter, the methylene chloride was added and mixing was effected again for 10 s at 1000 rpm. Thereafter, the isocyanate (TDI-80) was added and stirring was effected once again at 2500 rpm for 7 s. The mixture was then introduced into a mould which was open at the top and measured 30 cm×30 cm×30 cm. During the foaming, the height of rise was then measured by means of an ultrasonic height measurement. The rise time designates that time which elapses until the foam has reached its maximum height of rise. The collapse designates the sagging of the foam surface after the blowing of the hot flexible polyurethane foam. The collapse is measured 3 minutes after the blowing. The foam density was measured according to DIN EN ISO 845 and DIN EN ISO 823. The number of cells was counted by means of a magnifying glass having a scale at three points and the values were averaged. The compressive strength was measured according to DIN EN ISO 3386-1 and the SAG factor was calculated from the quotient of the compressive strength at 65% compression and 25% compression of the foam. Thus, the SAG factor is a measure of the resilience of the foam.

Table 5 shows the results of the test foaming for the hot flexible polyurethane foam. The siloxane mixture used, the rise time (RT) in seconds, the foam height (FH) in cm, the collapse (CO) in cm, the foam density (FD) in kg/m³ and the cell count (CC) in cells/cm and the SAG factor (SAG-F) are stated.

TABLE 5

| Example | Siloxane mixture from | RT/ s | FH/ cm | CO/ cm | FD/ (kg/m$^3$) | CC/ cm$^{-1}$ | SAG-F |
|---|---|---|---|---|---|---|---|
| Ex. 30 | Ex. 13 | 100 | 30.9 | 0.5 | 21.3 | 7 | 2.3 |
| Ex. 31 | Ex. 14 | 87 | 31.9 | 0.2 | 20.8 | 6 | 2.2 |
| Ex. 32 | Ex. 15 | 97 | 31.4 | 0.1 | 21.1 | 6 | 2.2 |
| Comp. 13 | Comp. 6 | 96 | 31.3 | 0.5 | 20.3 | 6 | 1.9 |

The results show that the siloxane formulations (compositions) according to the invention are suitable for the preparation of hot flexible foam, and an improvement in the SAG factor (resilience) can additionally be achieved.

Foamings in Ester Foam:

The siloxane mixtures were investigated in a typical polyester-polyurethane foam formulation:

Raw materials: Desmophen 2200 from Bayer, toluoylene diisocyanate (TDI 80/20) from Bayer, N-methylmorpholine (NMM).

Foam formulation: 100 parts of polyester polyol Desmophen 2200, 56.5 parts of TDI 80, 5.1 parts of water, 1.4 parts of NMM, 1.0 part of a mixture of the siloxane.

Procedure:

Polyol, water, catalysts and stabilizer were initially introduced into a paper cup and thoroughly mixed using a stirring disc for 60 s at 1000 rpm. Thereafter, the isocyanate (TDI-80) was added and stirring was effected once again at 2500 rpm for 6 s. The mixture was then introduced into a mould open at the top and measuring 30 cm×30 cm×30 cm. The height of rise and the collapse were determined. The collapse was designated as the decrease in the height of rise 1 minute after reaching the maximum height of rise.

After curing the foams, the cell count and the air permeability were determined. The air permeability is a measure of the proportion of open cells in the foam. For many applications, a foam which is as open-cell as possible is desired. The open-cell character of the foams was determined via the air permeability. The air permeability is stated in mm dynamic pressure of a water column which builds up if a constant airflow of 480 l/h is passed through the foam. The higher the stated value, the more closed-cell in character is the foam, and vice versa.

In the following Table 6, the results of the foamings of mixtures according to the invention (Examples 32 and 33) and of a mixture not according to the invention (Comparative Example 13) are summarized. The siloxane mixture, the foam height (FH in cm), the collapse (CO in cm), the air permeability (AP in mm) and the cell count (CC in cm$^{-1}$) of the foams obtained are shown.

TABLE 6

Results of the foaming experiments in polyester-polyurethane foam

| | Siloxane mixture from | FH/ cm | CO/ cm | AP/ mm | CC/ cm$^{-1}$ | Remarks |
|---|---|---|---|---|---|---|
| Ex. 32 | Ex. 16 | 29.4 | 0.7 | 23 | 13.7 | Defect-free |
| Ex. 33 | Ex. 17 | 29.2 | 0.5 | 17 | 13.2 | Defect-free |
| Comp. 13 | Comp. 7 | 28.9 | 0.6 | 15 | 11.7 | Coarser |

As can easily be seen from the results documented in Table 6, defect-free foams are obtained on using compositions according to the invention in the preparation of flexible polyester-polyurethane foams and higher cell counts can be achieved.

The invention claimed is:

1. A siloxane composition comprising:
   a siloxane or a siloxane copolymer; and
   at least one admixed component selected from the group consisting of cashew nut shell oil, cardanol, cardolite, cardol, methylcardol, anacardic acid, oxidation products of cashew nut shell oil, and residues from a distillation of the cashew nut shell oil, and mixtures thereof;
   wherein the mass ratio between the admixed component and the siloxane or siloxane copolymer is between 0.1 and 98 percent by weight.

2. A process of preparing polyurethane foams and/or polyisocyanurate foams and/or polyurea foams, the process comprising:
   adding the admixed component of claim 1 to a siloxane or a siloxane copolymer.

3. The process according to claim 2;
   wherein the siloxane or siloxane copolymer, and the admixed component, are free of nonylphenol alkoxylates or mineral oil-based admixed components.

4. The process according to claim 2;
   wherein the at least one admixed component is an oxidation product of cashew nut shell oil.

5. The process according to claim 2;
   wherein an auxiliary or a further admixture is used.

6. The process according to claim 5;
   wherein the further admixture is selected from the group consisting of flameproofing agents, dyes, pigment preparations, biocides, and antistatic additives.

7. A polyurethane foam and/or a polyisocyanurate foam and/or a polyurea foam prepared by the process of claim 2.

8. The foam according to claim 7;
   wherein the siloxane or siloxane copolymer, and admixed component, are free of nonylphenol alkoxylates or mineral oil-based admixed components.

9. The composition according to claim 1;
   wherein the mass ratio between the admixed component and the siloxane or siloxane copolymer is between 0.3 and 95 percent by weight.

10. The siloxane composition according to claim 1, further comprising:
    auxiliaries or admixtures.

11. A polyurethane foam and/or a polyisocyanurate foam and/or a polyurea foam, made from the siloxane composition of claim 1.

12. The foam according to claim 11;
    wherein the siloxane or siloxane copolymer, and admixed component, are free of nonylphenol alkoxylates or mineral oil-based admixed components.

13. A rigid polyurethane foam and/or a rigid polyisocyanurate foam and/or a rigid polyurea foam, made from a siloxane composition comprising:
    a siloxane or a siloxane copolymer; and
    an admixed component selected from the group consisting of cashew nut shell oil, cardanol, cardolite, cardol, methykardol, anacardic acid, alkoxylates of cashew nut shell oil, oxidation products of cashew nut shell oil, and a residue from a distillation of the cashew nut shell oil;
    wherein the mass ratio between the admixed component and the siloxane or siloxane copolymer is between 0.1 and 98 percent by weight.

14. The rigid foam according to claim 13;
    wherein the siloxane or siloxane copolymer is selected from the groups consisting of polyethersiloxane and polydimethylsiloxane.

15. The rigid foam according to claim 13;
    wherein the siloxane or siloxane copolymer is a polyethersiloxane with the formula:

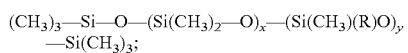

where:
   R" is H, $(CH_2)_z CH_3$, or $C(O)CH_3$;
   $x+y+2=60$ to 130;
   $x/y=5$ to 14
   $z=0$ to 4; and
   $a+b=10$ to 18.

16. The rigid foam according to claim 15;
    wherein:
    $x+y+2=67.2$;
    $x/y=7.2$; and
    $a+b=12$.

17. The rigid foam according to claim 13;
    wherein the siloxane or siloxane copolymer is a polyethersiloxane with the formula:

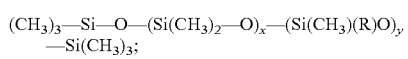

where:
   $R=(CH_2)_3-O-(-CH_2-CH_2-O)_a-(CH_2-CH(CH_3)-O)_b-R"$;
   R" is H, $(CH_2)_z CH_3$, or $C(O)CH_3$;
   $x=70$;
   $y=4$;
   $z=0$ to 4; and
   $a+b=10$ to 18;
   wherein the polyethersiloxane has two polyethers, with:
      37 equivalent % of polyether 1, where a is 36, b is 38, and R" is methyl; and
      63 equivalent % of polyether 2, where a is 12, b is 0, and R" is methyl.

* * * * *